United States Patent

[11] 3,590,425

| [72] | Inventor | Abraham Buddy Lieberman<br>4755 Boulevard des Grandes Prairies,, St. Leonard, (Montreal 457) Quebec, Canada |
|---|---|---|
| [21] | Appl. No. | 809,601 |
| [22] | Filed | Mar. 24, 1969 |
| [45] | Patented | July 6, 1971 |

[54] APPARATUS FOR PROCESSING A FLUID COMPOUND FOR PRODUCING FOAM MATERIAL FOR THE MANUFACTURE OF PRODUCTS HAVING A CELLULAR STRUCTURE
8 Claims, 9 Drawing Figs.

[52] U.S. Cl. .................................................. 18/4,
222/145, 264/47
[51] Int. Cl. .................................................. B29c 27/00
[50] Field of Search ......................................... 18/4 B;
222/145; 264/47, 54

[56] References Cited
UNITED STATES PATENTS

| 2,310,748 | 2/1943 | Pearson | 18/4 B UX |
| 2,341,732 | 2/1944 | Marvin | 264/147 X |
| 2,847,701 | 8/1958 | Welch | 18/4 (B) |
| 3,099,518 | 7/1963 | Wetzler | 18/4 (B) X |
| 3,185,611 | 5/1965 | Rodman et al. | 264/47 X |
| 3,269,882 | 8/1966 | Willy | 18/4 (B) X |
| 3,422,178 | 1/1969 | Junker et al. | 18/4 (B) X |

Primary Examiner—J. Spencer Overholser
Assistant Examiner—Michael O. Sutton

ABSTRACT: The herein described method and apparatus of processing a fluid compound from two or more chemical charges for producing foam material, such as polyurethane foam, for the manufacture of products having a cellular structure, which briefly consists in the metering of these chemical charges, two contrarotating film-carrying rolls are in intimate contact with one another, each roll being in contact with one of the two chemical charges, which are located in their respective receptacles, picks up or is applied with films of the metered chemical charge from its receptacle and forces it into intimate contact with the films of the metered chemical charge that is applied to or picked up on the other roll and effecting a blending action therewith and then directing the reactioning foam mixture onto the surface of a moving paperboard or other casting surface.

Fig. 1

INVENTOR

Abraham Buddy Lieberman

Fig. 4

INVENTOR
Abraham Buddy Lieberman

INVENTOR
Abraham Buddy Lieberman

INVENTOR

Abraham Buddy Lieberman

APPARATUS FOR PROCESSING A FLUID COMPOUND FOR PRODUCING FOAM MATERIAL FOR THE MANUFACTURE OF PRODUCTS HAVING A CELLULAR STRUCTURE

The invention relates to Improvements in a Method and Apparatus of Processing a Fluid Compound from Reactant Materials for the Manufacture of Products Having a Foamed Structure, as described in the present specification and illustrated in the accompanying drawings that form a part of the same.

The invention consists essentially of the novel methods and apparatus employed for the processing of a fluid compound made from chemical fluid charges which are isolated from one another in separate receptacles or stations, and then transferring the chemical fluid charges from the receptacles by means of outwardly contrarotating film-carrying rolls which are rotated into converging mutual nip sealing relation one with the other and are so constructed and arranged that the chemical fluid charges carried by the film-carrying rolls are mixed together at the sealed nip of the carrying rolls and expressed downwardly therefrom onto a travelling casting surface, situated beneath the rolls, to provide substantially continuous coating of the admixed fluids on the travelling casting surface.

Up to the present time, the manufacture of plastic foam materials is generally accomplished by selecting foam reactant materials from various known classes of compounds or compositions that will chemically foam or react in accordance with the kind of plastic foam that it is desired to produce. These foamable compounds or compositions are known in the art as being made from chemical charges, and these chemical charges in their fluid or liquid state are separately fed into a single tank or container, which may be termed a mixing head, to which is fitted agitator and temperature control equipment. These chemical charges, while in the mixing head, are mixed or blended together through pneumatic or mechanical means, which form a part of the mixing head equipment, so as to create a frothing mixture within the mixing head, and this mixture may either be distributed over a moving horizontal surface by reciprocating transverse motion of the mixing head and through nozzles attached thereto, or the mixing head may be stationary and the mixture fed therefrom to a dispensing unit that is suspended across the horizontal casting surface, which is moving in a longitudinal direction, for distributing the mixture thereon.

In such methods the foaming speed is dependent on the speed of the mixture. This operation is necessarily slow as the chemical charges must be thoroughly blended and consequently the speed of foaming is severely limited. Furthermore there is another disadvantage to the use of such methods and that is, in order to lay down the fluid mixture across a wide casting surface that is continuously moving in a longitudinal direction, it is necessary for the mixing head and/or its nozzle or nozzles to traverse the entire width of the surface which is constantly moving in a lineal direction. Thus operating means is further limited by the nozzle's deposit and by the speed at which the nozzle can traverse and return. The same objections are applicable when the frothable mixture is dispersed through a metering device, which may extend transversely across the horizontal casting surface, or by an extrusion system.

Another disadvantage to such methods is that the frothable mixture is made in a mixing chamber or container, such as a mixing head, and has no way of leaving the same except through nozzles or other dispensing means attached thereto. In many instances, some of the frothable mixture may adhere to the walls, corners and other inner parts of the mixing head and prematurely commence creaming and subsequently curing therewithin. This may materially affect the proper mixing of the reactant materials, as well as fouling the mixing equipment, and troublesome and time-consuming cleaning operations may be required at frequent intervals.

It is therefore the purpose of this invention to avoid the objectionable features and disadvantages which have been found in such methods and means that have been used in the manufacture of foam materials, as well as to overcome their limitations, by devising a novel method and means of processing the desired fluid compound in which the reactant materials or chemical charges are removed from their respective receptacles in metered film form, by means of contiguous contrarotating film-carrying rolls which longitudinally engage with one another in constant tight abutment engaging contact and are rotated in an outward direction from one another, and which also form the means to carry their respective metered films of chemical fluid charges on a collision course towards one another and, upon the chemical fluid charges reaching the underside of the longitudinal point of constant tight abutment engaging contact, where they are prevented from entering between the contrarotating film-carrying rolls, the chemical fluid charges are deflected therefrom in a downward direction, thereby causing the intermixing and blending of the chemical fluid charges and effecting a chemical reaction that forms a frothable mixture which drops onto a casting surface travelling beneath the carrying rolls.

Among the objects of the invention is to avoid the need of the use of mixing heads, agitators, mixture ejection nozzles, extrusion systems and other equipment connected therewith for the production of fluid compounds or compositions, made from reactant materials or chemical charges, for use in the manufacture of products, and in place thereof provide a method and means that will speed up the processing of the fluid compounds or compositions, increase the output and maintain a more homogeneous mixture of the reactant materials or chemical charges that form the compound or composition.

Another object of the invention is to device a method and apparatus for the production of a foamable compound whereby the isolated reactant materials for forming the compound, and located in separate receptacles, will be picked up by the same means that will cause the self-blending together of the reactant materials in an unconfined space and the fall of the thus blending mixture onto the casting surface passing therebeneath.

Still another object of the invention is to quickly and efficiently produce a polyurethane foam, made from chemical fluid charges, for the manufacture of products having a cellular structure by devising a method and means that will pick up the chemical fluid changes, blend them together and cast the subsequent mixture onto a casting surface through the action of contrarotating means, all in a continual uninterrupted operation.

Still a further object of the invention is to devise a method and apparatus for the production of a foam material that will jointly and simultaneously remove the chemical fluid charges, requisite to make the foam material, from their respective receptacles, mix them together and then cast the mixture onto a casting surface in a continuous uninterrupted flow, so long as it is required and providing that the fluid supply of the chemical charges are maintained in their respective receptacles.

Still a further object of the invention is to devise a method and apparatus for making foam material that will automatically and simultaneously start and stop with respect to the picking up of the chemical fluid charges, their blending together and the casting of the subsequent mixture onto a casting surface without being confined in any way.

A further object of the invention is to devise a method and apparatus of processing a foam compound for producing foam materials whereby the mixing or blending of the chemical fluid charges, for forming the foam compound, is made in the open area situated above a moving casting surface as it is actually being laid thereon.

Another object of the invention is to make a foam compound by effecting the self-blending of the chemical fluid charges thereof in an open area and permitting the resultant frothable mixture to fall transversely across the face of a casting surface that is moving in a longitudinal direction.

A further object of the invention is to process a fluid compound for producing a foam material by blending the chemical fluid charges thereof as it is actually being applied to a layer or layers of sheet material, molds or other casting surfaces and with which the mixture reacts and sets in the expanded state as it is supported by and advanced away from the point of application on the moving casting surface.

Further objects and advantages of the present invention will be apparent from the description of the disclosures of the invention and the illustrations thereof.

IN THE DRAWINGS

Like numerals of reference indicate corresponding parts in the various figures.

In describing the acceptable methods and apparatus for carrying out the invention, the description of the disclosures and the accompanying drawings specify that it is applicable for the processing of fluid compounds for the production of polyurethane foam materials and used in the manufacture of thin foam laminates, but it will of course be understood that the invention may be used for the production of any polyurethane products, whether rigid or flexible, cellular or homogeneous, and that the methods and apparatus are capable of producing fluid compounds from other reactant materials used in the making of various products.

In the method of processing a fluid compound from chemical fluid charges to make a foam material, such as a polyurethane foam, for the manufacture of products having a cellular structure, the chemical fluid charges may be selected from those known reactants which form a polyurethane foam. Acceptable chemical charges may be a polyhydroxy component and a polyisocyanate component which are kept in separate receptacles, removed therefrom and blended together in a homogeneous mix for the production of the foam material and which is used as the core of a laminated board to be manufactured or for other products having a cellular structure.

The foam unit comprises a combined fluid metering and mixing apparatus having a pair of film-carrying rolls forming a tight nip sealing relation with one another. Each of the film-carrying rolls serves to meter chemical fluid charges respectively on the surface of each carrying roll, which two chemical fluid charges are carried outwardly and beneath the respective film-carrying rolls where they meet at the underside of the tight nip and are expressed downwardly therefrom, while simultaneously intermixing and blending into a frothable mixture, onto a moving surface passing beneath the film-carrying rolls and under the sealed nip thereof, the moving surface being in the form of a paperboard or other casting surface.

The feed from a roll of casting surface, such as paper board, is arranged to pass immediately under the sealed nip of the contiguous contrarotating film-carrying rolls to form a bottom layer and the reactioning foam mixture lays on the casting surface in the form of a thin film laminate.

The reactioning foam mixture is expressed downwardly on the surface of the paperboard or other casting surface at the point of the converging mutual nip sealing relation of the contrarotating film-carrying or pickup rolls, the paperboard being moved along for a predetermined distance, where it is joined by a top layer of paperboard or of other material to form a "-sandwich" or laminated board. The laminated board is confined between top and bottom rollers which are located at the point of commencement of the formation of the laminate or adjacent thereto. By compression and restriction of the laminate, unevenness can be rolled out while the thin film laminate is still in the "cream." The gap between the top and bottom rollers may be adjusted so as to allow a subsequent expansion of the foam to the required thickness.

The reactioning of the foam mixture may be temperature-controlled, so that it does not begin until the mixture has passed through the nip of the top and bottom rollers, ordinarily before and after the full gaseous reaction has taken place, and a series of confining rollers may be arranged to control the amount of foaming and the continued uniformity of the required foamed thickness of the laminate. The foam sheet or laminated board formed may then be passed through suitable curing ovens (not shown) to accelerate the curing process, if required, so that the laminate may become substantially cured, nontacky, and self-supporting.

Since the mixture reactions and sets in the expanded state as it is supported by and advanced away from the point of deposit or casting on the casting surface, which is moving along at a predetermined speed over a specified distance, time element becomes an important factor, particularly when it is required to change the density or the foam laminate, for effecting chemical reaction to the mixture at the proper time and place along the distance of travel of the casting surface and to maintain this reaction until the foaming process has been completed. The acceleration and deceleration of the time period for effecting the chemical reaction to the mixture may be regulated and controlled to a greater or less degree by heating the contrarotating film-carrying or pickup rolls which will heat the films of chemical fluid charges that have been picked up from their respective receptacles and condition the films of chemical charges for quicker acceleration of their reaction when they are forced against one another and effect their self-blending as the frothable mixture falls onto the casting surface.

In this way it will be noted that in making a "sandwich" structure of plastic foam of either flexible or rigid type, or in making foam for other structures, the mixing of the chemical fluid charges is actually produced in the open, or what may be termed in an unconfined or unrestricted area, and the blending mix concurrently and/or subsequently is applied to or between layers of sheet material, molds or other casting surfaces as it is required.

Figure 1:
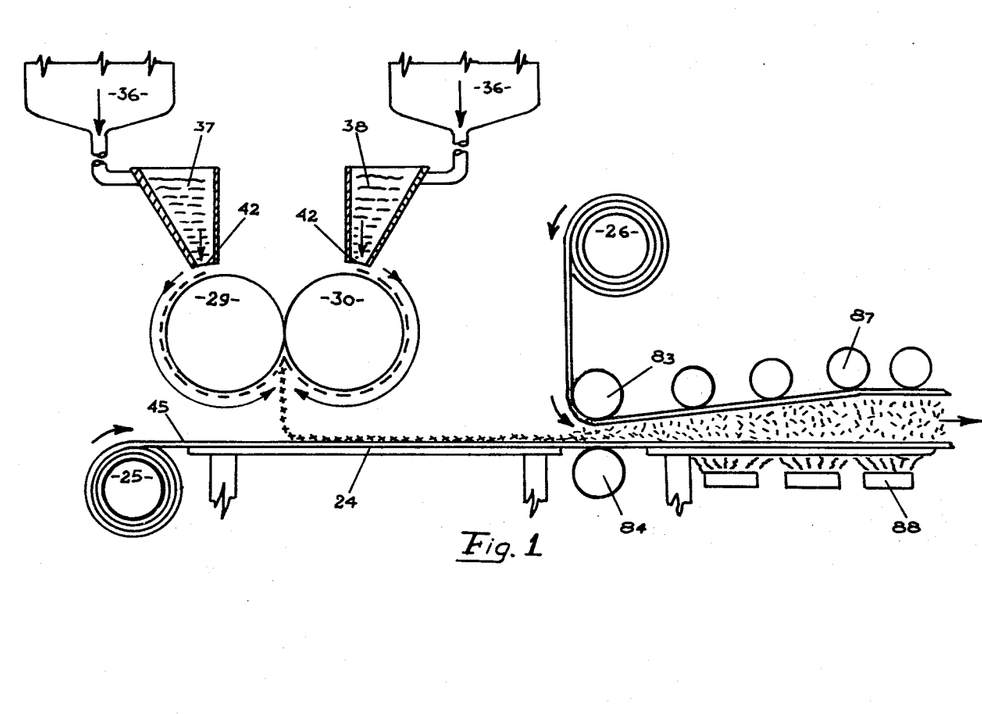
FIG. 1 is a diagrammatic view showing a method of processing a fluid compound for producing foam materials for the manufacture of products having a foam structure.
Figure 2:
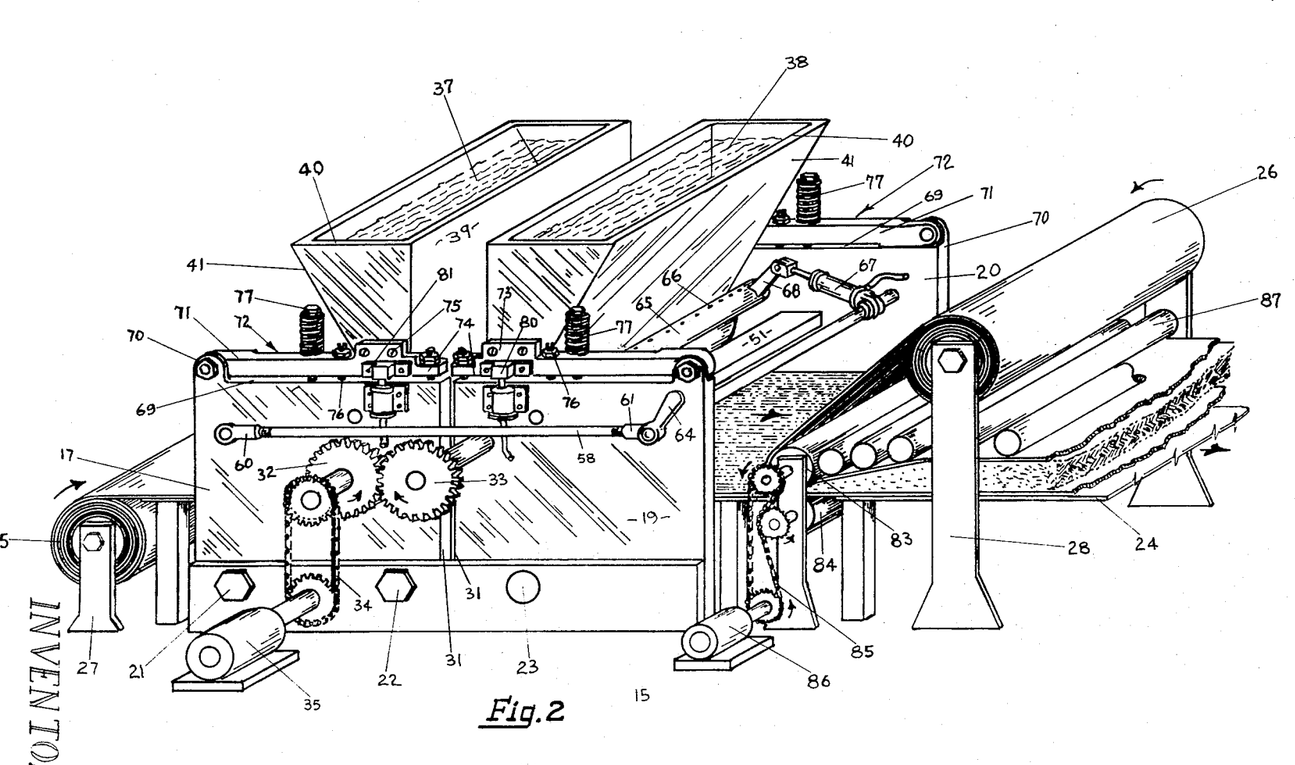
FIG. 2 is a perspective view of the apparatus for carrying out the method as illustrated in FIG. 1.
Figure 3:
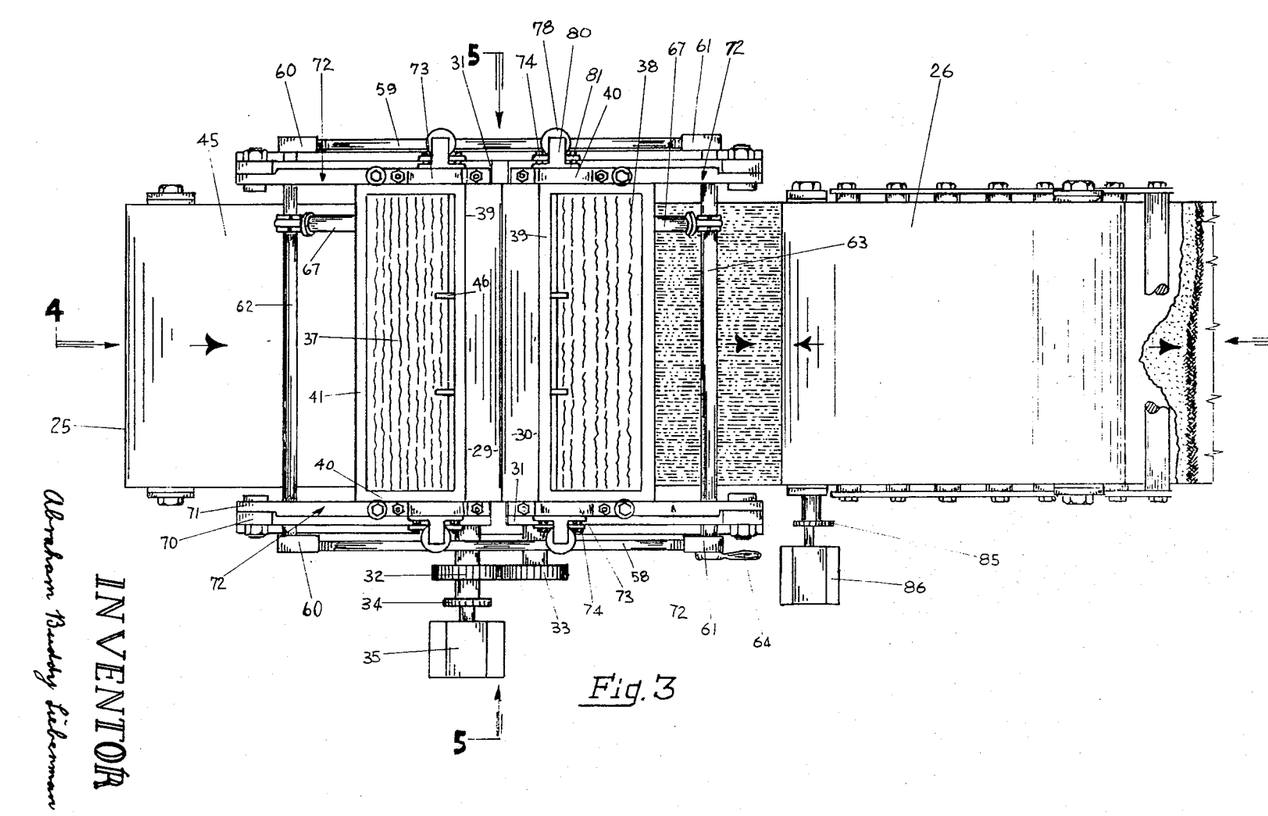
FIG. 3 is a top plan view of the apparatus as illustrated in FIG. 2.
Figure 4:
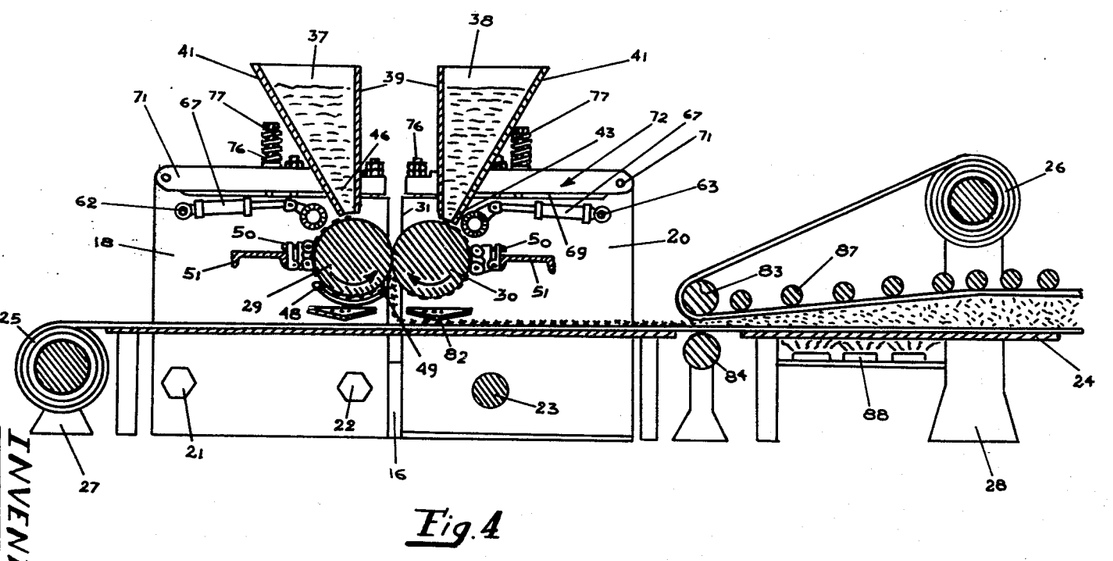
FIG. 4 is a longitudinal sectional view as taken along the line 4-4 in FIG. 3.
Figure 5:
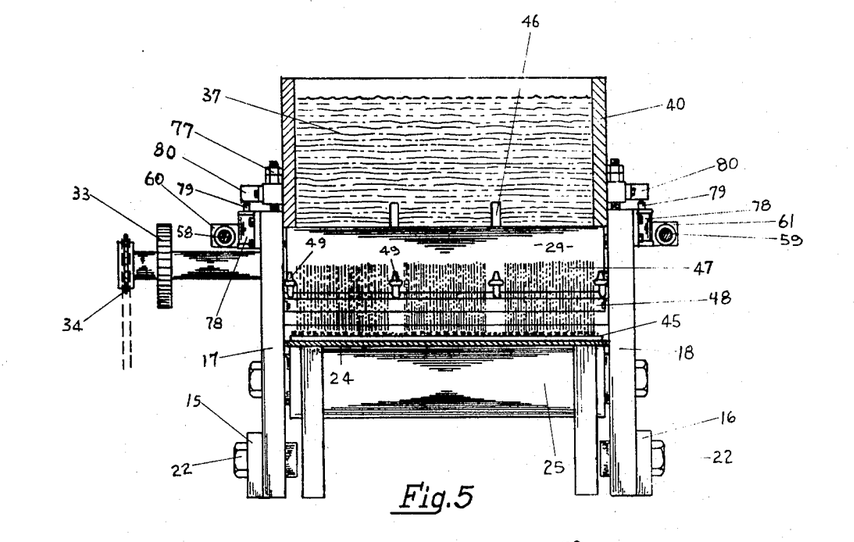
FIG. 5 is a cross-sectional view as taken along the line 5-5 in FIG. 3.

The apparatus for carrying out the process, as illustrated in FIG. 1, consists of a rectangular framework having open ends and provided with longitudinal and parallel base members, as indicated by the numerals 15 and 16, and from which extend upwardly the sidewalls or panels 17, 18, and the movable sidewalls 19 and 20. The lower portions of the side fixed walls 17 and 18 are bolted or otherwise secured to the base members 15 and 16 at 21 and 22, while the lower portions of the sidewalls 19 and 20 are journaled or rockably mounted on the transverse shaft 23 which is fixedly secured to the base members 15 and 16.

One or more rectangular-shaped tables 24 are arranged in longitudinal alignment with one another and are provided for supporting the horizontal surfaces of the moving casting surfaces, such as paperboard, that are fed from rolls 25 and 26 journaled on the standards 27 and 28, the tables 24 being located between the base members and their accompanying sidewalls of the apparatus.

The two outwardly contrarotating film-carrying rolls 29 and 30 are in intimate longitudinal contact with one another and are journaled to the upper portions of the sidewalls of the framework of the apparatus and are located above the level of the rectangular tables and extend transversally to the longitudinal direction of travel of the casting surface which is supported on the rectangular tables. The contrarotating film-carrying roll 29 is journaled to the fixed sidewall 17 and 18 while the contrarotating film-carrying roll 30 is journaled to the movable sidewalls 19 and 20, and these film-carrying rolls 29 and 30 are so situated that the longitudinal converging inverted sealed nip between the two rolls will be located intermediate of the adjacent inner vertical edges 31 of the fixed and movable walls.

Adjacent ends of the outwardly contrarotating film-carrying rolls are connected to intermeshing gears 32 and 33, which in turn are driven by a chain and gear mechanism 34 operated by a motor 35 or other suitable source of power.

The fluid chemical charges may be stored in reservoir tanks 36 suitably located and automatically pumped or otherwise fed into their respective receptacles 37 and 38 and, as shown in FIG. 1, the receptacles may be in the shape of hopperlike structures. Each of the hopperlike shaped receptacles is formed of a vertical front wall 39, sidewalls 40 and an angular rear wall 42, the rear wall converging towards the front wall so as to form therewith a lower discharge opening 42 which may extend from one sidewall to the other sidewall and will be of a predetermined length. The lower ends of the front and rear walls terminate in metering or doctor blade edges 43 and the lower ends of the sidewalls may terminate in arcuate-shaped edges 44 that will follow the curvature of the contrarotating film-carrying and blending rolls 29 and 30.

The hopperlike shaped receptacles are located above the upper circumferential portions of the contiguous outwardly contrarotating film-carrying rolls and are adjustable in relation thereto with respect to the metering or calibrating of the chemical fluid charges onto the film-carrying rolls. In this way the chemical charges will be applied or picked up by the outwardly contrarotating film-carrying rolls uniformly throughout their lengths in a continuous and unbroken line so that, when the chemical fluid charges are carried to the underside of the converging inverted sealed nip the outwardly contrarotating film-carrying rolls and prevented from entering therebetween, the chemical fluid charges will be forced against one another and mixed together, change direction and fall in a downward course, in a uniform manner along the length of the outwardly contrarotating film-carrying rolls, onto the surface of the moving paper board or other casting surface in a reactioning foam mixture.

In this method of using contrarotating film-carrying rolls, application width is only limited by the length of the rolls. It is then simply a matter of using longer rolls for wider surface contact. When it is required to shut off the apparatus for one reason or another, in order to stop the flow of frothable mixture onto the casting surface 45, the space between the roll surfaces and the discharge ends of the hopperlike shaped receptacles may be closed by simply bringing the lower ends of the receptacles into intimate contact abutment with the film-carrying roll surfaces and the chemical fluid charges will be prevented from leaving the discharge openings of the receptacles, even though the contrarotating film-carrying rolls may still be rotating.

When the outwardly contrarotating film-carrying and blending rolls and the hopperlike shaped receptacles have to be of a length that will extend across an expansive width of a casting surface that is passing thereunder in a lineal direction, it may be necessary to effect a control of the density and uniformity of the films of chemical fluid charges as they are applied or picked up by the outwardly contrarotating film-carrying rolls, as the length of such rolls may create a deflection and an uneven distortion to the rolls in a longitudinal and/or transverse direction during their rotation and thereby causing the chemical fluid charges, in the form of films that are being carried by the contrarotating rolls, to disperse unevenly along the surface of the rolls, particularly towards their intermediate portions, and develop accumulated spotty patches which may effect an uneven blending together of the chemical fluid charges and disrupt the density and uniformity of the blending materials as they fall "curtain-like" onto the casting surfaces of the moving paperboard or of other materials.

An acceptable means for overcoming such objectionable effects that may be created through the possible deflection and distortion of the outwardly contrarotating film-carrying and blending rolls is to divide the length of the discharge openings of the hopperlike shaped receptacles into a plurality of individual openings, separated from one another by transverse partitions 46 of a predetermined height and width and which are secured to the front and rear walls of the receptacles and extend upwardly from the lower edges of the front and rear walls and with which they are in flush uniformity, and thereby forming spacer blocks between each of the multiple discharge openings thus formed. Consequently the chemical fluid charges contained in the receptacles will leave the same through a plurality of independent aligned discharge openings as they are applied or picked up by the longitudinal intimate contact outwardly contrarotating film-carrying rolls and positioned thereon in the form of films of parallel ribbons 47 of a width in accordance with the length of their respective discharge openings from which they are emitted. These films of ribbons on the film-carrier rolls are spaced apart from one another by the "dry run" portions of the contour surfaces of the outwardly contrarotating film-carrying rolls which pass beneath the bottom walls of the spacer blocks that form the transverse partitions.

In order to prevent the "dry run" portions of the contour surfaces of the outwardly contrarotating film-carrying rolls from being encroached by the adjacent films of ribbons that are carried by the contrarotating rolls, an air conduit 48 extends in a parallel relationship to the length of the outwardly contrarotating film-carrying rolls and supports and air feeds a plurality of air nozzles 49 that are directed to the "dry run" portions of the film-carrying rolls and in this way maintain and control the films of ribbons on the outwardly contrarotating film-carrying rolls.

In order to minimize any deflection and uneven distortion to the outwardly contrarotating film-carrying rolls, compression adjustment means are applied against the two outwardly contrarotating film-carrying rolls at predetermined locations along their lengths so as to distribute the pressure therealong and maintain them in a constant converging inverted sealing relation with one another in a longitudinal direction and thereby materially reduce the possibility of any deflection or distortion of the outwardly contrarotating film-carrying rolls particularly while they are in rotation.

Figure 6:
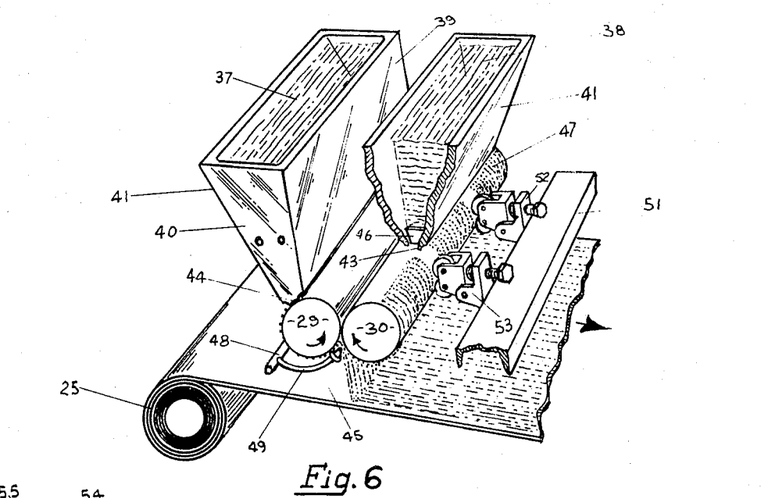
FIG. 6 is an enlarged fragmentary perspective view illustrating the coordination of the receptacles, which contain the chemical fluid charges, and the intimate contact contrarotating pickup rolls which carry the chemical fluid charges from the receptacles and cause them to be forced into intimate contact with one another and to freely blend together so as to fall in a downward direction onto a casting surface.
Figure 7:
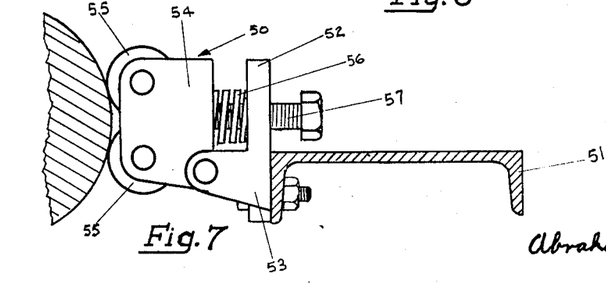
FIG. 7 is an enlarged fragmentary detail of an acceptable means for maintaining constant contact pressure between the contiguous contrarotating film-carrying rolls.

Various pressure adjustment means may be utilized to accomplish this purpose, such as illustrated in FIGS. 6 and 7, in which the pressure adjustment means consists of a plurality of compression adjustment units 50 that are placed in alignment with the "dry run" portions of the contour surfaces of the outwardly contrarotating film-carrying rolls and are bolted or otherwise secured to the cross members 51 which are secured to the sidewalls of the apparatus and extend in close parallel proximity to the contrarotating film-carrying rolls.

Each of the compression adjustment units 50 consists of a vertically arranged bracket 52 having its lower end secured to the cross member 51 and provided with integral ears 53 to which is journaled the cramp 54. A pair of pressure rolls 55 is rotatably mounted to the cramp 54 and is adapted to be kept in constant pressure contact against the surface of a contrarotating film-carrying roll by means of the compression spring 56 and the setscrew adjustment 57.

The intermeshing gears 32 and 33, secured to and carried by the outwardly contrarotating film-carrying rolls 29 and 30, may be disengaged from one another so as to separate the contrarotating rolls from intimate contact with each other, and this is accomplished by having adjustable connecting rods 58 and 59 provided with left- and right-hand threads at their opposing ends and which engage with the internally threaded sockets 60 and 61, which in turn are rotatably mounted on the transverse shafts 62 and 63 that are journaled or otherwise secured to the fixed sidewalls 27 and 18 and the movable sidewalls 19 and 20 respectively. An actuating lever 64 is secured to the transverse shaft 63 that is connected to the movable sidewalls and is for the purpose of pulling away the movable sidewalls from the fixed sidewalls through the medium of the transverse shaft 63 and the adjustable connecting rods 58 and 59, and as the outwardly contrarotating film-carrying roll 30 and its accompanying gear 33 is journaled to the movable sidewalls, it will be automatically separated from the outwardly contrarotating film-carrying roll 30 and its accompanying gear 33 is journaled to the movable sidewalls, it will be automatically separated from the outwardly contrarotating film-carrying roll 29 and its accompanying gear 32 which is journaled to the fixed side walls 17 and 18.

When it is desirable to stop the operation of the apparatus for one reason or another, it is important that the chemical fluid charges carried by the contrarotating rolls in the form of films, prior to or at the time of stoppage, be "killed" to prevent reactioning of the of the blending chemical fluid charges at the converged inverted sealed nip between the two outwardly contrarotating film-carrying rolls, otherwise there may be a possibility that the blending chemicals at and adjacent to the sealed nip between the two outwardly contrarotating film-carrying rolls will become a glutinous or viscid mass that will adhere to the two outwardly contrarotating film-carrying rolls and could effectually retard or prevent the rotation of the outwardly contrarotating film-carrying rolls.

An acceptable method and means for avoiding the clotting or congealing of the blending chemical fluid charges is to add a solvent to the chemical fluid changes that are being carried by the outwardly contrarotating film-carrying rolls in the form of films, prior to or at the time of stopping the operation of the apparatus, which will have the effect of "killing" any reactioning tendencies of the chemical fluid charges. The solvents may be inserted in tubular containers 65 that are located in close proximity to the outwardly contrarotating film-carrying rolls and extend therealong in a parallel formation therewith, and are journaled in the sidewalls of the apparatus or to other suitable supporting means.

Each of the tubular containers 65 has at least a row of apertures 66 formed through the container wall and which extend in a longitudinal direction therealong and through which the solvents, in the container, are expelled under pressure such as in the form of a spray onto the roll surfaces carrying the films of chemical charges. The tubular containers may be rotated in any suitable manner to bring the apertures thereof in operative or inoperative positions with relation to the contrarotating outwardly contrarotating film-carrying rolls. An acceptable way of rotatably adjusting the positions of the tubular containers may be accomplished by suitably operated air cylinders or compressors 67 which are journaled to the transverse shafts 62 and 63 and having their piston ends 68 secured to the tubular containers.

While the apparatus is being operated, the tubular containers are rotated to inoperative positions and the apertures thereof are then pointed in upward directions and away from the direction of the film-carrying rolls. When the apparatus is to be stopped, the hopperlike shaped receptacles are brought into intimate contact with the surfaces of the outwardly contrarotating film-carrying rolls and thereby cutting off the supply of chemical charges to the outwardly contrarotating film carrying rolls; the contrarotating film-carrying rolls still being in operation, the tubular containers are then brought into operative positions so as to bring the apertures of the containers into alignment with the outwardly contrarotating film-carrying rolls, and the solvents contained in the containers are then expelled through the container apertures onto the outwardly contrarotating film-carrying rolls and which effectually "kills" the films of chemical fluid charges remaining on or adhering to the surfaces of the outwardly contrarotating film-carrying rolls. The apparatus may then be stopped, and the tubular containers are then returned to their inoperative positions. The apparatus may then recommence its operation, the hopperlike shaped receptacles are separated from their intimate contact with the outwardly contrarotating film-carrying rolls and allow the chemical fluid charges to be applied or picked up by the outwardly contrarotating film-carrying rolls.

It may be noted that, in order to "kill" the films of chemical fluid charges clinging to the surface of the outwardly contrarotating film-carrying rolls, it is not necessary to stop the operation of the outwardly contrarotating film-carrying rolls, and the outwardly contrarotating film-carrying rolls may be cleansed from time to time during the running operations of the apparatus. When it is deemed pertinent to cleanse the outwardly contrarotating film-carrying rolls, the receptacles are brought into abutting contact with the surfaces of the outwardly contrarotating film-carrying rolls so as to stop the flow of the chemical fluid charges from being applied to or picked up by the outwardly contrarotating film-carrying rolls, the tubular containers are then brought into operative positions and the solvent solutions are sprayed or otherwise applied to the surfaces of the outwardly contrarotating film-carrying rolls so as to destroy any reactivated tendencies of the chemical fluid charges that may remain on or adhere to the surfaces of the outwardly contrarotating film-carrying rolls. When the surfaces of the outwardly contrarotating film-carrying rolls are cleansed, the spraying of the solvent solutions onto the outwardly contrarotating film-carrying rolls is shut off, the tubular containers are brought into inoperative positions, and the receptacles released from their abutting contact with the surfaces of the outwardly contrarotating film-carrying rolls so as to allow the flow of the chemical charges to continue onto the surfaces of the outwardly contrarotating film-carrying rolls. All this is accomplished without stopping the rotation of the outwardly contrarotating film-carrying rolls at any time and without interrupting the production of the foaming material, since the cleansing operation is effected very quickly and the "killed" portion of the chemical charges is permitted to be dropped on the casting surface where it will be absorbed by the foaming material on the casting surface.

The top flat surfaces 69 of the sidewalls have their outer end portions merging with the lugs 70 that are integral with the sidewalls and to which the outer ends 71 of the rectangular-shaped lever arms 72 are journaled. The lever arms 72 are provided with stepped shoulders 73 which are adjacent to their inner ends 74 for the purpose of securing the sidewalls 40 of the receptacles 37 thereto by fastening members 75 or other suitable securing means. Vertical inner threaded apertures are also formed through the lever arms 72 for the introduction therethrough of the adjustable setscrews 76 and the compression setscrews 77 and which are used as calibrating means for setting the predetermined distances between the discharge ends of the receptacles and the circumferential surfaces of the contrarotating film-carrying rolls.

The actuating means for raising and lowering the receptacles 38 for abutment engagement and disengagement with the contrarotating film-carrying rolls may be accomplished by pneumatic or mechanical means, such as by pneumatic actuators 78 which are secured adjacent to the top edges of the sidewalls of the apparatus and operate the protruding pistons 79 that are adapted to engage the undersides of the lift blocks 80 which are integral with and project outwardly from the fastening members 81 that are secured to the lever arms 72 and preferably with the shoulder portions 73 thereof.

In the event of any fluid leakages from the receptacles and/or the outwardly contrarotating film-carrying rolls, drip pans 82 may be provided for receiving the same and which are suitably supported from the sidewalls of the apparatus and located beneath the outwardly contrarotating film-carrying rolls.

After the reactioning foam mixture is expressed downwardly onto the surface of the paperboard 25 at the point of the sealed nip of the outwardly contrarotating film-carrying rolls 29 and 30, the paperboard with the foaming material thereon is moved along for a predetermined distance, where it is joined by a top layer of paperboard 26 or of other material for the formation of a laminate or "sandwich." At this point of the joining of the lower and upper paperboards with the film laminate still in its "cream" stage, the laminate or "sandwich" is passed through the nip of top and bottom rollers 83 and 84 which are driven by a chain and sprocket mechanism 85 operated by a power unit 86 and the foam thereafter is allowed to expand to the required thickness, and a series of confining rollers 87 and heating units 88 may be arranged to control the amount of foaming and the continued uniformity of the required foam thickness of the laminate and the curing of the same.

From the foregoing description, it will be noted that the means for carrying out the method of processing a fluid compound for foam material is in the form of a mixing apparatus for mixing two different fluids in intimately admixed relation. The apparatus briefly consists of a first axially elongated surface 29 to receive in operation a first of the fluid deposited at a first station or receptacle 37 in adhering relation to the surface 29. A second axially elongated surface 30 is transversely aligned with the first surface 29 to receive in operation the second of the fluid deposited in adhering relation thereon at a second station or receptacle means 38 and which is spaced apart from the first station or receptacle means 37. Drive means are provided for rotating the first and second surfaces 29 and 30 into converging inverted mutual nip sealing relation with one another.

A casting surface 45 is located beneath the sealed nip, and means are provided to move the casting surface 45 past the nip at an angle inclined therefrom, whereby in operation the first and second fluids are mixed at the nip and expressed downwardly onto the casting surface 45, to provide substantially continuous coating of the admixed fluids on the moving casting surface.

Figure 8:
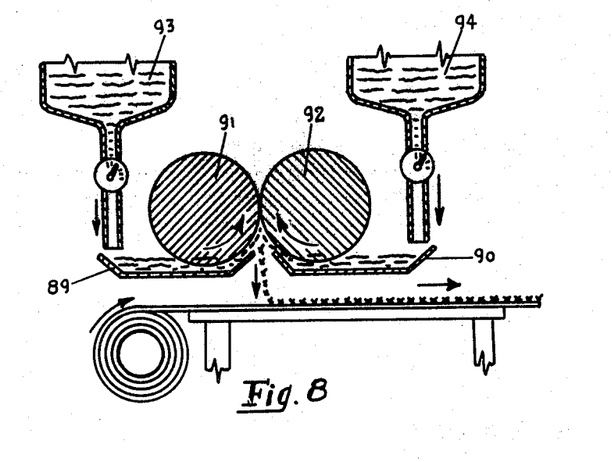
FIG. 8 is a diagrammatic view showing a modification of the method in which the receptacles for the chemical charges are situated below the contiguous contact contrarotating pickup rolls.

In the modification of the method and apparatus as illustrated in FIG. 8, the receptacles 89 and 90 are in the form of shallow pans which are located beneath the sealed nip of the outwardly contrarotating film-carrying rolls 91 and 92, and the isolated chemical fluid charges are fed into their respective receptacles from the reservoirs 93 and 94. In this method, the outwardly contrarotating film-carrying rolls dip into their respective receptacles and pick up the films of chemical fluid charges therefrom and force them into intimate contact with one another for effecting the blending action in a similar manner to that already described in the method as illustrated in FIG. 1.

Figure 9:
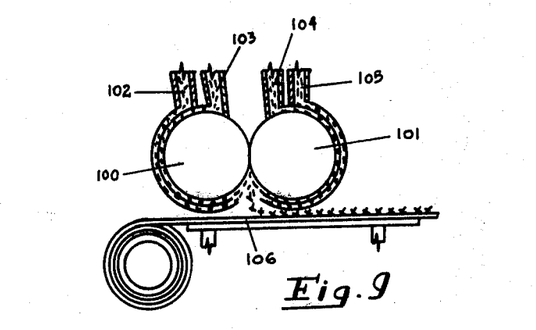
FIG. 9 is a diagrammatic view of a further modification of the method, in which each of the intimate contact contrarotating film-carrying rolls is provided with multiple receptacles for the discharge of a multiple of independent chemical charges for blending purposes.

In the modification of the method and apparatus as illustrated in FIG. 9, the method and means are somewhat similar as that described for FIG. 1, with the exception that the outwardly contrarotating film-carrying rolls 100 and 101 that are in longitudinal sealed nip contact with one another are each provided with multiple hopperlike shaped receptacles 102, 103 and 104 and 105, all containing isolated chemical fluid charges, and this is for the purpose of blending simultaneously the various chemical charges together for the manufacture of particular types of laminated structures, the intermixing chemical charges being prevented from entering between the outwardly contrarotating film-carrying rolls and ejected in a downward direction onto the casting surface 106.

Although certain embodiments have been given by way of example and illustration, it is obvious that various modifications of the structures and/or the methods may be made without departing from the spirit of the invention as defined in the appended claims. For example, equivalent elements and steps may be substituted for those described, parts may be reversed and various features may be used independently of the use of other features, all without departing from the spirit of the invention.

I claim:

1. A mixing apparatus for mixing two different fluids in intimately admixed relation, comprising a first axially elongated roll having a surface to receive in operation a first said fluid deposited at a first receptacle means in adhering relation to the roll having a surface, a second axially elongated surface transversely aligned with and in nip sealing relation with said first surface to receive in operation a second fluid deposed in adhering relation thereon at a second receptacle means spaced apart from the first receptacle means, drive means rotating said first and second surfaces into converging inverted mutual nip sealing relation, a casting surface located beneath said nip, and means to move said casting surface past said nip at an angle inclined therefrom, whereby in operation said first and second fluids are mixed at the nip and expressed downwardly onto said casting surface, to provide substantially continuous coating of said admixed fluids on said moving casting surface.

2. Mixing apparatus a claimed in claim 1, including a first receptacle means to contain said first fluid for deposition on said first surface, and a second receptacle means to contain said second fluid for deposition on said second surface.

3. Mixing apparatus as claimed in claim 1, wherein said first surface comprises the peripheral surface of a first axially elongated roll, and said second surface comprises the peripheral surface of a second axially elongated roll mounted for rotation in nip sealing relation one with the other.

4. Mixing apparatus as claimed in claim 2, wherein a said receptacle is located above said first or second surface, having an elongated opening therefrom, said surface being spaced in fluid metering relation with said opening, to control the rate of deposition of said fluid on said surface.

5. Mixing apparatus as claimed in claim 3, including first and second receptacle means having respective exits therefrom arranged in mutual metering relation with the surfaces of their respective first and second rolls to control the deposition of said fluids thereon.

6. Mixing apparatus a s claimed in claim 4, wherein one of said receptacle means to contain a fluid formed of the group hydroxy, and the other of the said receptacle means to contain a fluid formed of the group isocyanate.

7. Mixing apparatus as claimed in claim 5, wherein one of the said axially elongated rolls to receive a fluid formed of the group hydroxy from one of said receptacle means, and the other of the said axially elongated rolls to receive a fluid formed of the group isocyanate from the other of the said receptacles.

8. A mixing apparatus for mixing two different fluids formed from reactant materials in intimately admixed relation, to make a polyurethane foam, comprising a rectangular frame formed of parallel longitudinal bases, vertical walls extending upwardly from said parallel longitudinal bases and secured thereto, lever arms journaled to said vertical walls, first and second outwardly contrarotating axially elongated film-carrying rolls transversely aligned with one another and journaled to said vertical walls, drive means rotating said first and second outwardly contrarotating film-carrying rolls into converging inverted mutual nip sealing relation, first and second receptacle means formed of front, rear and sidewalls and secured to said lever arms, a plurality of transverse partitions of predetermined heights and widths secured to said front and rear walls of each of said receptacle means and extending upwardly from the lower edges of said front and rear walls and forming spacer blocks for completing a plurality of discharge openings in alignment with one another, said first receptacle means to contain a first fluid for deposition in adhering relation on said first axially elongated film-carrying roll in the form of spaced film ribbons thereon, said second receptacle means to contain a second fluid in adhering relation on said second elongated film-carrying roll in the form of spaced film ribbons thereon, an air conduit suitably supported and having a plurality of air nozzles to air spray under pressure the spaces located between the ribbons of films on said first and second axially elongated film-carrying rolls, whereby the ribbons of films maintain their distances from one another through the application of the aforesaid air sprays expelled from the air nozzles, a casting surface located beneath said nip, and means to move said casting surface past said nip at an angle inclined therefrom, whereby in operation said first and second fluids are mixed at the nip and expressed downwardly onto said casting surface, to provide substantially continuous coating of said admixed fluids on said moving casting surface.